United States Patent

[11] 3,614,237

[72] Inventors Robert J. Kyle
   Decatur;
   Donald M. Meadows, Marietta, both of Ga.
[21] Appl. No. 792,346
[22] Filed Jan. 21, 1969
[45] Patented Oct. 19, 1971
[73] Assignee Lockheed Aircraft Corporation
   Burbank, Calif.

[54] METHOD AND APPARATUS FOR CONTOUR MEASUREMENT
   12 Claims, 4 Drawing Figs.
[52] U.S. Cl. .................................................. 356/120,
   73/105, 350/162, 356/169, 356/156
[51] Int. Cl. ........................................................ G01b11/24,
   G01b 11/30
[50] Field of Search ........................................... 356/109,
   120, 156, 169–171; 250/237; 350/162; 73/105

[56] References Cited
   UNITED STATES PATENTS

| | | | |
|---|---|---|---|
| 1,590,532 | 6/1926 | Lenouvel | 356/239 |
| 2,379,263 | 6/1945 | Vine | 356/120 |
| 2,867,149 | 1/1959 | Goddard | 356/120 |
| 3,185,022 | 5/1965 | Holeman | 356/120 |

OTHER REFERENCES

Langenbeck, " Optical Wave-Front Mapping by Dual Interferometry," J.O.S.A., Vol. 58, #1, 4/68 pp. 499–505.
Theocaris, " Curvature Distributions..." J. of Sci. Instr. 6/1968, Vol. 1, Series 2, pp. 619– 622.
Theocaris et al., " Slope Measurement by Means of Moire Fringes" J. Sci. Instrum. Vol. 42, 1965 pp. 607– 610.
Dehmel, " Two High-Speed Dimensional Measuring Systems" 11th SPIE Tech. Symp. 8/66, pp. 91– 94.
" Interferometry" National Physical Laboratory Symposium #11 1960, pp. 182–4.

Primary Examiner—Ronald L. Wibert
Assistant Examiner—J. Rothenberg
Attorneys—Roger T. Frost and George C. Sullivan ABSTRACT: A technique for observing and measuring the contour of a surface with moire optical interference patterns. Illumination diverging from a source passes through a periodically repetitive image structure to cast a shadow image of such structure onto a surface being examined. The surface and the shadow image cast thereon are viewed through a periodically repetitive image structure to establish moire interference patterns. These moire interference patterns can be viewed as contour lines appearing on the surface and representing actual regions of equal elevation of the surface contour, and the actual increments of elevation between adjacent moire fringes can be determined.

PATENTED OCT 19 1971   3,614,237

INVENTORS.
ROBERT J. KYLE
DONALD M. MEADOWS
BY George O'Sullivan
  Agent
Roger T. Frost
  Attorney

METHOD AND APPARATUS FOR CONTOUR MEASUREMENT

This invention relates in general to contour measurement and in particular to a method and apparatus using moire pattern effects for measuring the contour of a surface.

The need to determine the dimensions of surface contour of an irregularly shaped object arises frequently in many different fields. For example, the automobile designer who has developed a clay model of a new automotive design must determine the dimensions to build a model in a larger scale or to provide tooling data. Similarly, an aircraft designer frequently needs to transform the exact contours of an airplane model to design dimensions or templates from which a larger scale aircraft can be built. Measuring the contours and shapes of the human body and inspection or gaging parts having complex surface contours are additional examples of problem areas wherein an accurate measurement of the contour of a surface must be made.

A number of techniques for accomplishing contour measurement are known to the prior art. Such techniques generally require the point-by-point determination of selected points on the surface being investigated. When the dimensions of a sufficient number of such points have been determined, a contour map of the surface can be constructed wherein lines on the map connect points of equal "elevation" with respect to some preselected reference. Alternatively, the dimensional information obtained can be used to construct a three dimensional model by known lofting techniques. The required point-by-point dimension determination is laborious and time-consuming, and requires either direct contact with the surface by means of feeler or a similar device which traces the surface to obtain a three-dimensional description thereof, or else requires the use of stereoscopic optional techniques to determine the depth of the surface as seen by the viewer thereof. In either case, each of many points or locations on the surface being examined must be precisely dimensionally located before a contour map or some other representation of the surface contour can be obtained.

Since such prior art contour measuring techniques even in their more refined forms require some amount of time before a contour map or other representation of surface contour can be obtained from a surface being observed, these techniques do not permit the direct real-time visual observation of surface contour conditions while the surface is being tested, for example, in a wind tunnel or during the application of vibratory force. It is apparent that a technique which would enable the observer of a model or some other object being tested under dynamic conditions to obtain a representation of surface contour lines to be viewed or photographed in real time would provide the observer with a powerful and useful analytical tool.

According to the present invention, there is disclosed and described a contour measuring method and apparatus for generating visual contour patterns which appear to exist as contour map lines overlaid on a contour surface being investigated and which in fact represent the contour of that surface. These contour lines may be viewed visually by an observer or may be photographed for subsequent analysis, and any change or variation in the contour of the surface being investigated is indicated immediately by a corresponding change in the aforementioned contour lines. With the present invention a model or another object can be subjected to testing forces and the effects of these forces on the surface contour of the model can be observed and photographed in real time. According to an embodiment of the present invention the establishment of certain parameters enables the exact numerical dimensions of the aforementioned contour lines to be determined with a high degree of accuracy with reference to a datum.

Accordingly, it is an object of this invention to provide an improved method and apparatus for surface contour measurement.

It is another object of this invention to provide a method and apparatus for surface contour measurement which generates visual patterns which appear to be present on a surface being examined and which correspond to the contour of the surface.

It is a further object of this invention to provide a method and apparatus for surface contour measurement which generates contour lines immediately viewable or recordable without the need of special viewing or analysis apparatus.

It is still another object of this invention to provide a surface contour measurement method and apparatus which enables real-time observation of changes in the contour of a time-varying surface.

It is another object of this invention to provide a method and apparatus for surface contour analysis which accurately and rapidly generates surface contour information without requiring conventional photogrammetric techniques and without requiring physical contact with the surface being analyzed.

The exact nature of this invention as well as other objects and advantages thereof will be readily apparent from consideration of the following specification relating to the annexed drawing in which.

Stated generally, contour measurement of a surface is accomplished according to the present invention by applying a periodically repetitive image to the surface being evaluated. The periodic image thus occurring on this surface is placed in interference with another periodic image in such a way that interference patterns known as moire fringes are formed. If certain requirements are met as set forth below, these moire fringes represent locations of uniform spatial phase shift between the aforementioned periodic images and also represent locations of uniform elevation of the surface being evaluated. These moire fringes appear as lines similar to the isogram lines of a conventional contour map, and these moire fringe lines can be viewed by the unaided eye and photographed. A precise mathematical relationship between adjacent fringes and the increment of surface elevation separating the areas covered by such fringes is shown.

Figure 1:
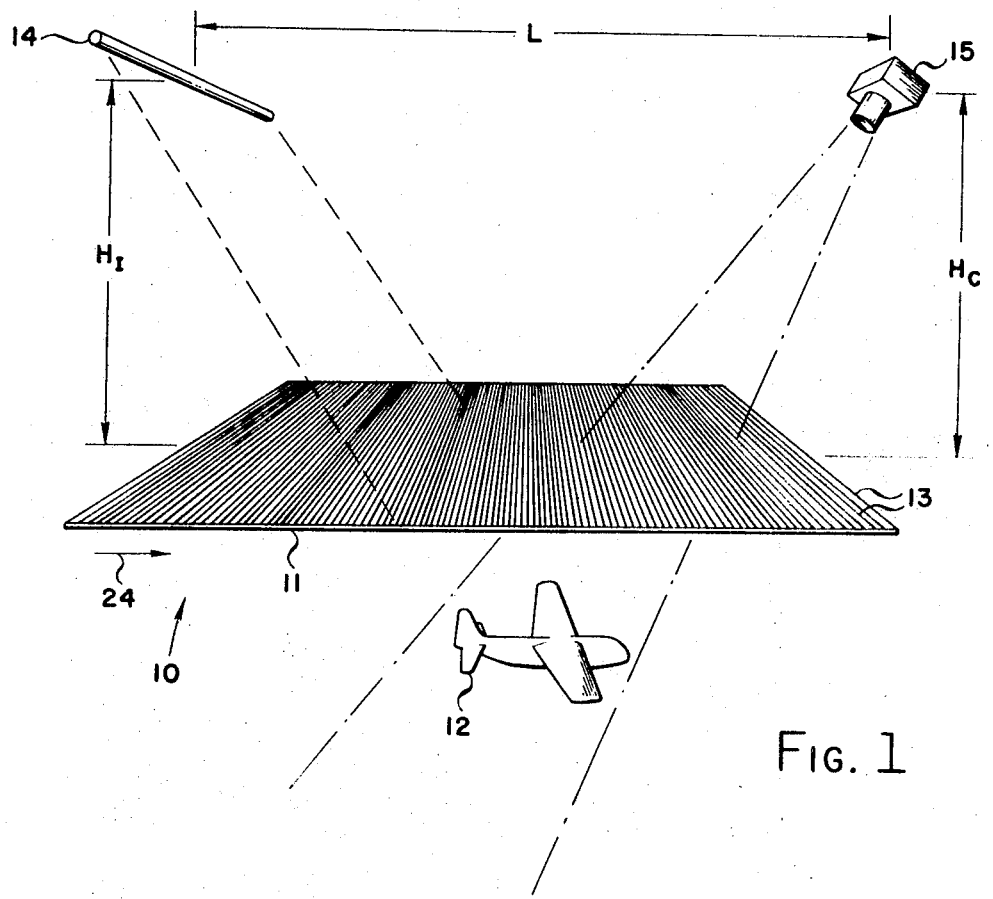
FIG. 1 is a perspective view of an object undergoing surface contour measurement according to an embodiment of the present invention.
Figure 3:
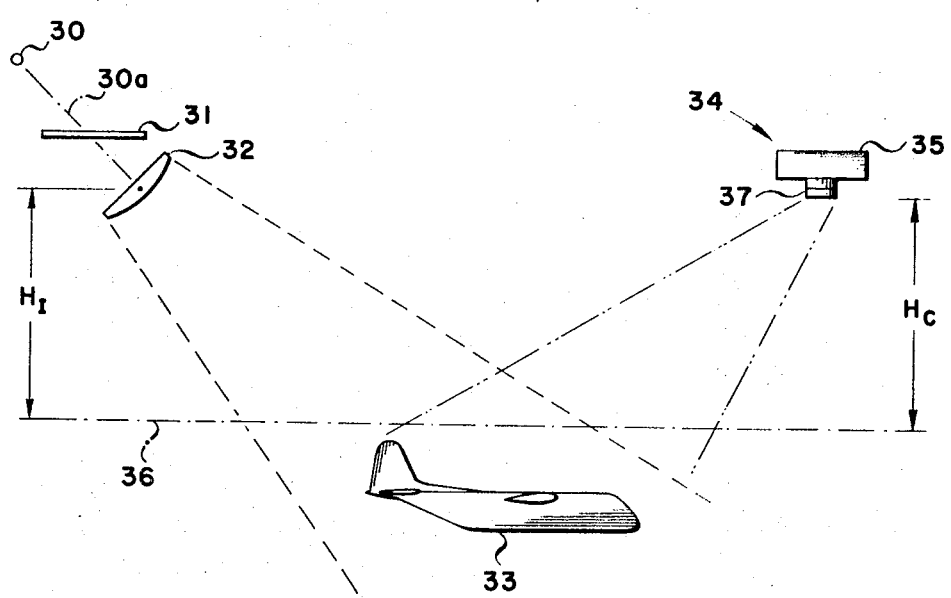
FIG. 3 is a perspective view of another embodiment of the invention.
Figure 2:
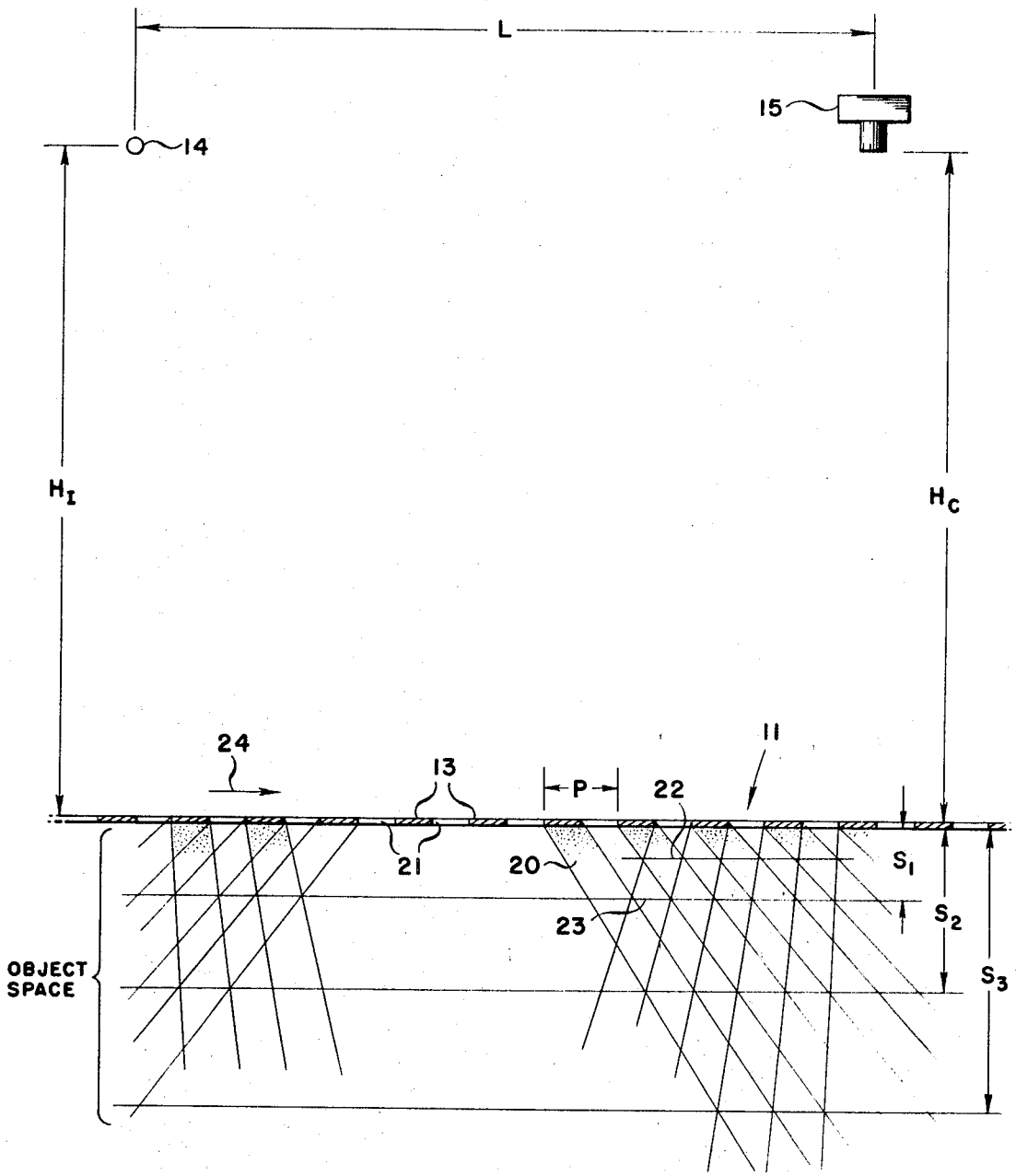
FIG. 2 is an elevation view of a schematic representation of the embodiment of FIG. 1 with the object omitted.

Turning now to FIGS. 1 and 2 for a more detailed explanation of an embodiment of the present invention, there is shown contour measuring apparatus indicated generally at 10 and including a grid 11 disposed adjacent an object 12 the contour of which is to be examined. The grid 11 is characterized by a periodic shadow-casting structure which constitutes a repetitive pattern of transparent and opaque segments, and the grid preferably can comprise a series of uniformly spaced apart parallel opaque lines 13 disposed on a transparent member by any suitable technique. The spaces between the opaque lines 13 define a corresponding series of transparent lines 21. A source 14 of illumination is positioned a distance $H_I$ above the grid 11. For the most effective operation of the embodiment described herein, the width, or extent, of the illumination source 14, as measured along distance 24, should be minimized. Accordingly, the illumination source 14 is of a type known in the art, such as a line or a point source of illumination, producing illumination diverging outwardly from the source. If a line source is used, the source is aligned as shown in FIGS. 1–3 so that the line of illumination is parallel with the lines 13 and 21 of the grid 11.

An observation point 15 on the same side of the grid 11 as the illumination source 14 is defined at a location $H_C$ above the grid and spaced a distance L from the illumination source as measured parallel with the grid plane and transverse to the grid lines. This observation point 15 may include the lens of a suitable camera, or it may merely be a point where the eye of an observer can view the contour lines appearing on the object 12 as described below.

The optical interference patterns necessary for contour measurement according to the present invention are formed by overlaying one periodic image structure with another such structure, where one of these image structures has been modified by the contour of the surface being examined. This is effectively accomplished by considering the grid 11 as a first periodic image structure and by considering as the second periodic image structure the shadows cast from illumination source 14 by the grid 11 onto the subject 12 being examined. The presence of these two interfering optical image structures is more readily visualized by reference to FIG. 2. As shown therein, each of the individual opaque lines 13 of the grid 11 casts a shadow 20 in a region on the side of the grid remote from the illumination source, this region being designated the "object space." These shadows 20 comprise a periodic image structure which is a counterpart of the grid 11, and this counterpart periodic image structure can be known as the grid shadows. A surface disposed in the object space and exposed to this grid shadow is covered with alternate regions of darkness, where the shadows strike the surface, and of brightness, where the illuminating passing through the transparent grid lines 21 strikes the surface.

Now assume that the grid 11 and an object in the object space are viewed from point 15 by an observer. Referring again to FIG. 2 such an observer sees, of course, the individual opaque lines 13 of the grid 11. Through the transparent spaces or lines 21 between the opaque lines, however, the observer can see the object positioned in the object space, including the lines of the grid shadow cast upon the object. If a location on the surface of an object in the object space is positioned a certain distance below the grid 11, the grid shadow cast on that location is exactly positioned so that this shadow can be seen through the transparent spaces 21 as viewed from the observation point 15. Thus, if the line 22 shown in FIG. 2 is taken to represent a portion of the surface of an object positioned in the object space, then this surface 22, as viewed from the observation point 15, appears substantially completely dark if certain conditions of the grid 11 have been met as described below. This state of darkness occurs because the observer at point 15 sees (1) the opaque lines 13 of the grid 11 and (2) the grid shadow cast upon surface 22 and viewed through the transparent lines 21 of the grid 11.

If the surface located beneath the grid 11 is positioned as shown at 23, the grid shadow cast on the surface at 23 is substantially hidden behind the opaque lines 13 of the grid 11 as viewed from the observation point 15. Accordingly, an observer at that point sees the surface 23 substantially as illuminated by source 14 and without any visible grid shadow, although the observer also sees the grid lines 13 overlaid upon the surface 23.

The surface 23 is positioned a distance $S_1$ below the grid 11. This distance represents the location below the grid 11 where the pattern of the grid shadow has shifted one complete cycle relative to the pattern of the grid 11, a cycle being defined as the spacing between corresponding points of adjacent opaque lines 13 of the grid. It is apparent that other distances $S_2$, $S_3$, ... exist in the object space below the grid 11 corresponding to a shift of 2, 3, ... cycles of the grid shadow relative to the grid 11, and a corresponding region of darkness as seen from point 15 is present between each of distances $S_1$, $S_2$, $S_3$, .... If the grid 11 is planar, then these distances $S_1$, $S_2$, $S_3$, ... represent planes of brightness in the object spaces parallel to the grid 11, and it will be apparent that corresponding planes of darkness are present between each of the brightness planes.

If an object having a certain surface contour is placed in the object space so that this contour cuts across one or more of the planes defined by $S_1$, $S_2$, ..., then an observer at point 15 sees on the surface of that object alternating bands or regions of brightness and darkness as the object surface cuts across the brightness planes defined by spacing $S_1$, $S_2$, ... and the darkness planes positioned therebetween. These bands of brightness and darkness are seen from point 15 as moire fringes which have the appearance of contour lines existing directly on the object surface, and each of these bright and dark bands does in fact represent a region of equidistant spacing of the object surface beneath and in a plane parallel with the grid 11. Thus, the observer at point 15 sees the object being examined as though this object had been painted with contour lines arising from measurement and analysis of the surface.

The analysis and understanding of the present invention is enhanced by considering that the periodic image structure of the grid 11 has a certain spatial frequency measured along direction 24 parallel with the grid and transverse to the lines 21 and 13, that the grid shadow cast upon a surface in the object space also has a certain spacial frequency measured along direction 24, and that the spatial frequency of the grid shadow is modulated by the contour of a surface in the object space. The optical interference of the spatially modulated grid shadow with the grid itself results in the moire fringes which, as seen or photographed at point 15, represent locations of uniform phase shift, i.e., uniform spacing, between the grid 11 and the shadow-grid.

The moire fringes which appear to exist on a surface in the object space represent locations of uniform and determinable elevation on the surface of the object being examined if the geometry of the grid 11, the illumination source 14, and the viewing point 15 meet certain requirements. Thus, if the illumination source 14 and the observation point 15 both are equidistant from the grid 11, then $H_F = H_C = H$. If the distance of separation L between the illumination source and the observation point is taken parallel to the plane of the grid 11 and perpendicular to the lines 13 and 21 on the grid, then it can be shown that $$S_1 = \frac{PH}{L-P}$$

$$S_2 = \frac{2PH}{L-2P}$$

$$\ldots$$

$$S_n = \frac{nPH}{L-nP}, \quad (1)$$

for the $n$th plane of brightness beneath the grid 11, where $P =$ the pitch of the grid 11, defined as the spacing between adjacent repetitive characteristics of the grid. The spatial frequency of the grid 11 thus is 1/p.

To show the effect that varying the parameters of the foregoing equation has on the elevational resolution of the contour lines afforded by the present invention, let $R = L/P$. Then, by substituting in equation (1):

$$S_1 = \frac{H}{R-1}$$

$$S_2 = \frac{2H}{R-2}$$

$$\ldots$$

$$S_n = \frac{nH}{R-n} \quad (2)$$

From the foregoing, it is shown that the number of planes or distances $S_1$, $S_2$, ... present in a given perpendicular distance below the grid 11 is a function, among other things, of the pitch P of that grid. For instance, where a relatively large number of planes for a given distance in the object space are required, that is, where the perpendicular distance between adjacent moire fringes on a surface being investigated is to be made small to increase the resolution of the contour measurement, a grid 11 is provided having a correspondingly high spatial frequency, that is, a high number of opaque lines 13 and transparent lines 21 per unit length of the grid. If distance L remains constant, the high spatial frequency of the grid 11 causes R to be correspondingly high. Referring to equation (2), it can be seen that the distance S of each plane from the grid 11 is inversely proportional to the value of $(R-n)$, and the spacing between two adjacent planes, for example, the distance $(S_x-S_1)$, is correspondingly diminished for increasingly high values of R.

The distances H and L and the pitch of the grid 11 are chosen to provide the desired degree of resolution between adjacent moire fringes occurring on a surface being evaluated, and so this choice is dependent to a certain extent upon the relative contours of such surface and the degree of resolution desired. For example, satisfactory results have been obtained using $H=30$ inches and $L=50$ inches, but such specific values are not to be considered critical. It has been found that satisfactory results are obtained with grids having a pitch P ranging from one-half inch to 0.005 inch, although the foregoing figures are set forth only by way of example and are not considered to be limitations upon the practice of the invention. As the grid frequency increases, however, the diffraction of light passing through the grid limits the maximum viewing depth below the grid in the object space, since the displacement of the light by diffraction becomes significant relative to the pitch of the grid.

Optimum results for the present contour measuring techniques, as viewed with the unaided eye or as photographed without the need for subsequent enhancement by graphic techniques, are obtained when the width of each opaque line 13 is at least equal to the width of each transparent line 21. This condition, which is identified as at least a 50 percent duty cycle of the grid 11, insures that each line of the grid shadow on a surface in the object space, as viewed from point 15 through a transparent line 21, is at least as wide as each of these transparent lines, so that the dark moire contour bands seen on the surface from point 15 are substantially black. If the duty cycle of the grid 11 is less than 50 percent, e.g., if the width of the opaque lines 13 is less than the width of the transparent lines 21, then the lines of the grid shadow as viewed from point 15 are not as wide as the transparent lines 21 and so the moire contour pattern seen at point 15 consists of bands of grey and white rather than of contrasting black and white. However, graphic enhancement techniques known to those skilled in the art enable a moire pattern consisting of alternating bands of brightness and grey to be converted into a photographic image having the desired black and white contrast.

For duty cycles greater than 50 percent, the width of the bright lines of the moire contour pattern is reduced. A grid 11 having a duty cycle greater than 50 percent may be used, for example, to define more precisely the position of the contours with a given grid frequency and setup geometry.

The width of illumination source 14, as measured in direction 24 parallel to the grid plane and perpendicular to the lines 13 and 21, is chosen to approximate a point source to insure that a sharp image of each grid line is cast into the object space. The optical contrast between adjacent contour lines and the maximum available depth of field, that is, the range of contour elevation, generally increases as the width of the illumination source decreases in the direction 24 and the rays of illumination emanating from the source 14 become increasingly divergent. It has been found that best results are obtained with an illumination source width nor greater than the width of an opaque line 13, although satisfactory results with a reduced depth of field have been obtained with illumination sources of greater width.

Although the grid 11 has been described as a transparent member having opaque lines disposed thereon, any suitable device or technique may be used which provides the appropriate arrangement of repetitive relatively opaque and transparent segments to cast the grid shadow and to provide the periodic image structure for establishing optical interference with the grid shadow. For example, an alternative construction of the grid 11 uses a number of taut parallel wires as the opaque segments, with the spaces between the wires serving as the transparent segments.

The embodiment depicted in FIGS. 1 and 2 is particularly useful for evaluating the contour of relatively small objects or scaled-down models of larger articles such as a full-sized aircraft. It is apparent that practical physical limitations on size of the grid 11 in certain applications may preclude the use of this embodiment to measure the contour of relatively large objects such as a full-scale aircraft or even a sizable segment thereof, e.g., a wing, or a portion of the earth's surface. However, these practical difficulties can be overcome with the present invention as applied through an alternative embodiment shown in FIG. 3, wherein the grid shadow is projected onto the object being evaluated and the optical interference structure necessary for the development of contour-indicating moire fringes is positioned at the observation point. This can be done in a number of ways as indicated below.

The projection technique shown in FIG. 3 includes a source of illumination 30, a grid projection slide 31 positioned in the path of illumination from source 30, and a lens 32 as required to project the image of the grid slide onto an object 33 being examined. The grid slide 31 has a periodic image structure similar to that of the grid 11 in FIGS. 1 and 2, with the grid slide being of an appropriate size of the optical projection of the necessary grid shadow onto the object 33.

The embodiment depicted in FIG. 3 uses a grid slide 31 having uniform line width throughout its extent and positioned parallel to the selected datum plane 36, so that a uniform grid shadow image is projected onto the datum plane. A grid slide that is positioned perpendicular to the axis of projection 30a can be substituted, however, if the grid image on such a slide is deliberately distorted to the extent necessary to produce a uniform grid shadow image as projected on to the selected datum plane 36.

The periodic image structure of the grid slide 31 as projected onto the surface of the object 33 is analogous to the grid shadow of the previous embodiment, and the spatial frequency of the projected grid shadow is modulated by the variations in the surface contour of the object 33. The object 33 and the grid shadow projected thereon are photographed by a suitable camera 34 positioned at a location analogous to the observation point 15 described above. The geometry of this embodiment is similar to that of the FIG. 1 embodiment, with $H_I$, the distance from the nodal point of the lens 32 to a selected datum plane 36, being equal to $H_C$, the distance from the nodal point of the camera lens 37 to the datum plane.

To provide the second grid required to produce the moire contour patterns, a grid or grid pattern must be applied to the image present at the focal plane 35, and this second grid structure must have the same pitch as that of the grid slide 31 to retain the geometric considerations on which equations (1) and (2), above are based. This second grid can be provided in a number of ways. For example, a second grid slide can be physically present at the focal plane 35 as a transparency overlay on the photographic film on which a picture of the object 33 and the grid shadow projected thereon is made. The pitch of this second grid slide must be the same as the pitch of the focal plane image of the grid shadow occurring at the datum plane 36, so that the required moire inference between the second grid slide and the focal plane image of the projected grid shadow is established. If this second grid slide (not shown) is properly positioned with respect to the image at the focal plane 35 the desired moire contour patterns are present at the focal plane and can be photographed or viewed as desired.

This result can be visualized if one imagines that the grid 11 present in FIG. 1 is broken into two segments along a line extending into the perspective of that figure, with the first segment being repositioned adjacent the source of illumination 14 and the second segment being repositioned at the observation point 15 so that both segments are in parallel planes one with the other. This is a lensless version of what is depicted in FIG. 3, and the dark regions and bright regions may be visualized as being present below the grid slide and focal plane grid of FIG. 3 just as described above with reference to FIGS. 1 and 2.

Positioning of a grid at the focal plane 35 to accomplish accurate moire contour patterns requires accurate adjustment or either that grid or the grid slide 31 before a photograph can be made. Moreover, it is evident that the spatial position of the camera 34 and its associated focal plane 35 must be rigidly fixed with respect to the remainder of the apparatus in FIG. 3, for even a slight movement of the camera and its associated grid and focal plane could cause the camera grid to be optically misaligned. Such alignment requirements may undesirably limit the number of photographs which can be taken in a given time period. To overcome this, accordingly, the object 33 being evaluated along with the shadow grid projected thereon simply is photographed with the camera 34 as illustrated in FIG. 3, without any camera grid slide or other repetitive structure being present at the focal plane 35. The negative thus obtained is processed and printed in any suitable conventional manner. To provide the second grid necessary to produce the moire contours, a transparent overlay sheet is provided having impressed thereon a grid structure similar to that heretofore positioned on the focal plane 35 of the camera, with allowance being made for the extent of enlargement, if any, of the print with respect to the image size present at the focal plane. Thus, if the enlarged print of the photograph taken at the focal plane is a 4X reproduction of the focal plane image, the grid of the transparent sheet overlaid on the print should effectively be a corresponding enlargement of the grid slide heretofore positioned on the camera focal plane to provide the necessary moire interference. The transparent grid sheet then simply is laid over the photograph and positioned to provide proper registration with the shadow grid depicted on the photograph, at which time the moire contour patterns can be seen on the photograph through the transparent overly grid.

Equations (1) and (2) described in the embodiment of FIGS. 1 and 2 also apply to the FIG. 3 embodiment, assuming again that $H_f=H_c=H$. Since the datum plane 36 is selected arbitrarily and is not a real grid, the value of P at the datum plane must first be obtained. This may be done simply by placing a suitable planar projection screen at the datum plane 36a known or measurable distance $H_f=H_c=H$ and measuring the pitch P of the grid image projected on the screen. This value of H and P, along with L, can be used in equation (1) to determine the perpendicular distance from the datum plane 36 of a selected $n$th plane of brightness below the datum plane. It is apparent that an infinite number of such datum planes exist and that, unlike the real grid 11 of FIGS. 1 and 2, contour lines exist above the datum plane 36 as well as below this datum plane.

Figure 4:
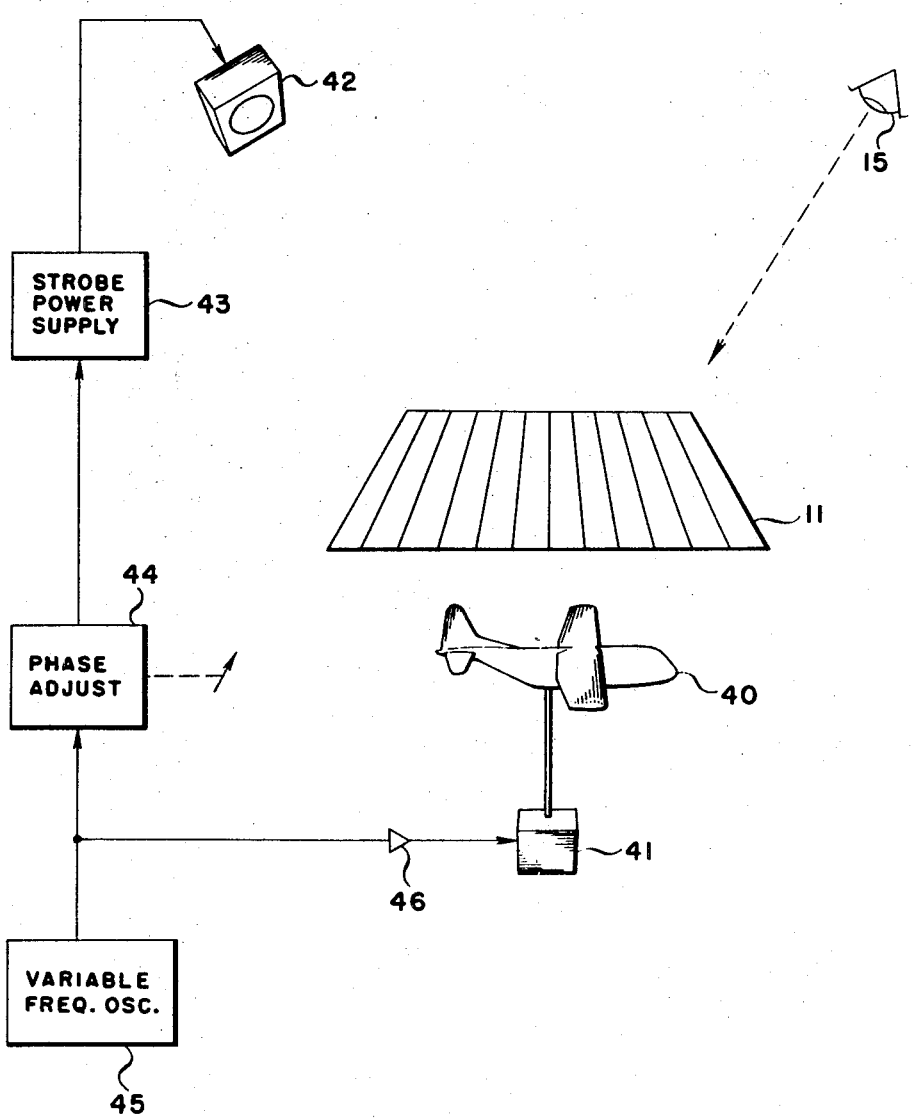
FIG. 4 is a perspective view of still another embodiment of the invention used as an analysis technique for time-varying surfaces.

An example of an application using the present invention is shown in FIG. 4 wherein an object 40 being tested, such as an aircraft model, is subjected to vibration from a suitable source of motive force such as an electromechanical transducer 41. Above the object 40 there is a grid 11, an observation point 15, and an illumination source 42 all as described herein, the illumination source in this instance being a suitable stroboscopic lamp of the type which emits discrete flashes or pulses of light. The stroboscopic lamp is powered by a power supply 43 connected through a phase adjust circuit 44 to the output of a variable frequency oscillator 45. The output of the oscillator 45 also is supplied through a power amplifier 46 to drive the transducer 41.

When the transducer 41 is energized to vibrate the object 40 at a particular frequency, the moire contour lines on the surface of the model, as seen at observation point 15, would appear to move if lighted continuously, since the vibration changes the distance from the surface of the object to the grid 11. However, this movement of the contour lines can be visually stopped by the stroboscopic action of the illumination source 42, which selectively can be frequency-locked to the vibration causing the contour movement. Moreover, the instantaneous nature of the contour variation at any point in a cycle of the vibration frequency can be observed by adjustment of phase control 44, which adjusts the time in a vibration cycle when the stroboscopic lamp fires. This enables an operator of the embodiment depicted in FIG. 4 to observe and photograph dynamic events such as the onset of flutter in a localized area of a structure being energized by the transducer 41.

Although the present invention is described herein with reference to specific embodiments, it will be understood that this invention may be used for surface contour measurement wherever a suitable periodic image can be applied to the surface and the resulting spatially modified periodic image can be viewed or examined through another periodic image to produce the moire interference patterns which give contour information. For example, the present invention can be used for contour elevation of both model and real-world terrain conditions, including large scale contour mapping. The dynamic effects of a load traversing a deformable roadway, for example, have been portrayed graphically with the aid of the present invention. Numerous other applications will be apparent to the person skilled in the art.

What is claimed is:

1. Method of measuring the contour of a surface, comprising the steps of:
    casting a pattern of periodically repetitive illumination diverging outwardly from a source toward the surface being examined to establish on such surface a pattern of said illumination which is spatially displaced by the contour of the surface;
    reflecting said pattern of spatially displaced illumination from the surface toward an observation location; and
    passing the reflected illumination pattern through a periodic repetitive viewing structure which alternately blocks and permits the passage of the reflected illumination to establish a pattern of moire interference between said reflected pattern and said viewing structure so that said interference patterns contain surface contour information produced by said spatial displacement of said applied pattern of illumination.

2. The method as in claim 1, further comprising the steps of:
    casting said pattern of periodically repetitive illumination to make said pattern uniform as the pattern illuminates a predetermined plane in the region occupied by the surface; and
    positioning said repetitive viewing structure in a plane parallel to said predetermined plane.

3. The method of measuring the contour of a surface, comprising the steps of:
    Casting outwardly diverging illumination from an illumination source onto an optical grid to produce a pattern of illumination alternately having regions of shadow caused by opaque grid areas and regions of illumination caused by transparent grid areas;
    exposing a surface being examined to said pattern of illumination to produce a pattern of light and shadow on the contour of the surface; and
    passing the reflection of the light and shadow pattern on the contour of the surface through an optical grid alternately having opaque areas and transparent areas which establish optical interference between the reflected light and shadow patterns and the optical grid through which the reflection passed, said optical interference causing moire illumination patterns which correspond to the contour of the surface.

4. The method as in claim 3, wherein said step of passing the reflection through an optical grid includes the step of passing the reflection through said first-mentioned optical grid to establish moive interference patterns between the pattern of the grid and the pattern of light and shadow reflected from the surface.

5. The method as in claim 3, further comprising the step of passing the reflection through said first-mentioned optical grid directed toward an observation point positioned in a plane which includes said illumination source and which is parallel with said first-mentioned optical grid.

6. The method as in claim 3, wherein said step of casting illumination includes passing illumination through a grid slide and a projection lens means to project an image of the alternate opaque and transparent grid slide areas onto the surface; and said step of passing the reflected pattern of light and shadow includes forming an image of the reflected light and shadow pattern with a second lens means; and applying said last-mentioned optical grid to said image of the reflected pattern to establish optical interference between said image and said last-mentioned grid.

7. The method as in claim 6, wherein said step of forming an image with a second lens means includes the step of locating the second lens means a distance measured perpendicularly from a plane exposed to said pattern of illumination that is equal to the perpendicularly measured distance from said last-mentioned plane to the projection lens means.

8. Apparatus for measuring the contour of a surface, comprising:

illumination means for casting illumination diverging outwardly toward an object space in which a surface being examined may be positioned;

shadow casting means disposed in the optical path of said diverging illumination between said illumination source and the object space, said shadow casting means having a periodically repetitive pattern of parallel segments which are alternately opaque and transmissive with respect to at least a portion of the illumination spectrum and which cast a periodically repetitive shadow pattern having a certain spatial frequency of bright and dark regions onto the surface being examined, said periodic pattern of said shadow casting means producing the shadow pattern on a predetermined plane in the object space that would be cast thereon by a planar shadow casting means having a uniformly periodically repetitive pattern of a constant spatial frequency and disposed in said optical path to be parallel with said predetermined plane; and optical interference means positioned to receive an image of said periodically repetitive pattern reflected from the surface, said optical interference means having a periodically repetitive pattern of parallel segments having the same characteristics of alternate opacity and transmissivity had by said parallel segments of said shadow casting means to establish optical interference between the reflected image and the periodically repetitive pattern of said optical interference means;

said optical interference means being planar and being disposed in an interference plane parallel with said predetermined plane, the segments of said optical interference means having a spatial frequency equal to the spatial frequency of the reflected image present at the interference plane.

9. Apparatus as in claim 8, wherein the parallel segments both of said optical interference means and of said shadow casting means comprise alternately occurring transparent and opaque segments.

10. Apparatus as in claim 9, wherein said shadow casting means and said optical interference means comprise a unitary planar grid member having a plurality of uniformly spaced apart parallel opaque segments each of which is interspaced by a parallel transparent region, said grid member being disposed a predetermined known distance from said illumination means in the optical path between the illumination means and the surface being examined.

11. Apparatus as in claim 8 wherein:

said shadow casting means comprises a grid image projection member and said illumination means is positioned to cast illumination on said projection member; and further comprising optical lens means positioned to project the shadow pattern produced by said projection member into the object space.

12. The method as in claim 2, further comprising the step of:

viewing said interference patterns at an observation location which is spaced a distance measured perpendicularly from said predetermined plane which is equal to the distance measured perpendicularly from the source of diverging illumination to said predetermined plane.